(12) United States Patent
Frankel

(10) Patent No.: US 7,638,084 B2
(45) Date of Patent: Dec. 29, 2009

(54) METHODS FOR FORMING FIBER REINFORCED COMPOSITE PARTS HAVING ONE OR MORE SELECTIVELY POSITIONED CORE, STRUCTURAL INSERT, OR VENEER PIECES INTEGRALLY ASSOCIATED THEREWITH

(76) Inventor: Kenneth A. Frankel, 22604 58th Pl. South, Kent, WA (US) 98032

( * ) Notice: Subject to any disclaimer, the term of this patent is extended or adjusted under 35 U.S.C. 154(b) by 252 days.

(21) Appl. No.: 10/805,145

(22) Filed: Mar. 19, 2004

(65) Prior Publication Data
US 2005/0206043 A1 Sep. 22, 2005

(51) Int. Cl.
B32B 37/00 (2006.01)
B28B 7/30 (2006.01)
(52) U.S. Cl. .................. 264/512; 264/46.6; 264/101; 264/221; 264/225; 264/226; 264/257; 264/258; 264/313; 264/314; 264/317; 264/511; 264/516
(58) Field of Classification Search .................. None
See application file for complete search history.

(56) References Cited

U.S. PATENT DOCUMENTS

| | | | |
|---|---|---|---|
| 3,989,562 A * | 11/1976 | Hladik et al. ................. 156/79 |
| 4,202,856 A | 5/1980 | Frikken et al. |
| 4,681,724 A * | 7/1987 | Faiz et al. .................... 264/221 |
| 4,693,678 A * | 9/1987 | Von Volkli ............... 425/405.1 |
| 5,137,071 A * | 8/1992 | Ashton et al. ................ 156/382 |
| 5,985,197 A | 11/1999 | Nelson et al. |
| 6,110,406 A * | 8/2000 | Ishibashi et al. ............ 264/143 |
| 6,245,274 B1 * | 6/2001 | Huybrechts et al. ......... 264/257 |
| 6,248,024 B1 | 6/2001 | Nelson et al. |
| 6,264,868 B1 * | 7/2001 | Marchant .................... 264/221 |
| 6,340,509 B1 | 1/2002 | Nelson et al. |
| 6,399,199 B1 * | 6/2002 | Fujino et al. ................ 428/396 |
| 6,406,659 B1 * | 6/2002 | Lang et al. ................... 264/510 |
| 6,444,071 B1 | 9/2002 | Ayorinde |
| 6,458,306 B1 * | 10/2002 | Nelson et al. ............... 264/221 |
| 6,561,459 B2 * | 5/2003 | Amaoka et al. .......... 244/123.7 |
| 6,589,472 B1 | 7/2003 | Benson et al. |

(Continued)

*Primary Examiner*—Jeffrey Wollschlager
(74) *Attorney, Agent, or Firm*—Thomas E. Loop

(57) ABSTRACT

The invention disclosed herein relates to hollow fiber reinforced composite material parts having one or more selectively positioned core, structural insert, or veneer pieces integrally associated therewith. In one embodiment, the composite part defines a first shape and the method comprises at least the following steps: providing a mandrel that is substantially the same as but sized smaller than the first shape of the composite material part, wherein the mandrel has one or more selectively positioned complementary recesses; forming an elastic layer about the mandrel to define an elastic bladder; applying a vacuum in between the bladder and the mandrel to thereby force and conform the bladder against the exterior surface of the mandrel; applying a resin and a fiber material about the bladder, and positioning at least one of the one or more core, structural insert, or veneer pieces adjacent and proximate to one of the one or more selectively positioned recesses to define an uncured part; placing the uncured part into a mold; applying a fluid or gas pressure in between the mandrel and the uncured part to thereby force and conform the uncured part against the interior surface of the mold; and heating the mold to a temperature and for a period of time sufficient to cure the resin to thereby define the hollow composite material part.

12 Claims, 3 Drawing Sheets

U.S. PATENT DOCUMENTS 6,613,258 B1 * 9/2003 Maison et al. .............. 264/102
6,820,654 B2 * 11/2004 Lindsay ...................... 138/153
7,007,755 B2 * 3/2006 Reddy et al. ................ 166/294

* cited by examiner

METHODS FOR FORMING FIBER REINFORCED COMPOSITE PARTS HAVING ONE OR MORE SELECTIVELY POSITIONED CORE, STRUCTURAL INSERT, OR VENEER PIECES INTEGRALLY ASSOCIATED THEREWITH

TECHNICAL FIELD

The present invention relates generally to methods for forming hollow components and parts made of fiber reinforced composite materials and, more specifically, to hollow fiber reinforced composite material components and parts including those having one or more selectively positioned core, structural insert, or veneer pieces integrally associated therewith.

BACKGROUND OF THE INVENTION

The economic importance of composite materials is well known, and there are strong indications that this importance will be increasing into the future. In this regard, and for example, composite materials are being used with increasing frequency in the automotive, naval construction, and aerospace industries. As used herein, the term composite material simply refers to materials made of strong fibers (continuous or noncontinuous) surrounded by a matrix material, wherein the matrix material serves to distribute and secure the fibers and to facilitate transmission of an applied load to the fibers. The fibers and the matrix material used to make composite material parts are generally bonded together by using an appropriately selected molding process.

As way of background, polymer matrix composite material parts have been made in a variety of different molding processes, including, for example, contact molding, compression and depression molding, and resin injection molding. In the context of contact molding, for example, one or more layers of a selected fiber impregnated with resin (generally with an activator or accelerator) are placed on the surface of a mold (male or female). The impregnated resin fibers are then compacted by use of a roller, which also facilitates the removal or squeezing out of any trapped air pockets. The duration of the resin setting stage varies, depending on the amount of activator or accelerator used, from a few minutes to a few hours. Similarly, and in the context of compression molding, a countermold (i.e., one of two molds of a matched two-part mold set) is used to apply pressure uniformly against impregnated resin fibers that have been applied on the surface of the complementary mold. Depression molding is similar to compression molding; however, a vacuum is used to apply pressure against the complementary mold. Finally, resin transfer molding involves injecting an appropriately selected resin mixture into a closed mold containing dry fibers.

Although composite material molding is, in some respects, well known in the art, there has been little advancement with respect to methods for forming hollow composite material components or parts, especially hollow composite material components or parts having complex surface geometries or shapes. Additionally, there has likewise been little development with respect to methods for forming hollow composite material parts that have been structurally or cosmetically enhanced by the addition of selectively positioned core, structural insert, or veneer pieces. For example, U.S. Pat. No. 4,202,856 to Frikken et al. teaches one method for forming a hollow composite material part, but this method is not entirely satisfactory for forming high-precision parts with exacting specifications and tolerances. More specifically, the method taught by U.S. Pat. No. 4,202,856 to Frikken et al. is not entirely satisfactory for forming hollow parts having complex surface geometries because, among other reasons, the disclosed pressure bag (i.e., bladder) does not generally fit snuggly about the underlying mandrel (thereby making it more difficult and less exacting to uniformly apply resin, fibers, and/or core pieces about the mandrel). Moreover, and upon pressurization, the loosely fitting pressure bag poorly and nonconformally forces the uncured composite material into angular recesses of the mold thereby resulting in non-uniformity of material at those sites.

Other methods for forming hollow composite material parts include the methods disclosed in the family of U.S. patents to Nelson et al., namely, U.S. Pat. Nos. 6,458,306, 6,340,509, 6,248,024, and 5,985,197. The methods disclosed in these patents, however, are also not entirely satisfactory for forming hollow parts having complex surface geometries because, among other reasons, the disclosed flexible (but inherently "non-elastic") thin-film bladders used in these methods also do not fit snuggly about the mandrel (meaning that the disclosed bladders in these methods, without application of vacuum, are similarly nonconformal to the shape of the mandrel). As such, these methods are also not generally amenable for forming hollow composite material parts having one or more selectively positioned core, structural insert, or veneer pieces integrally associated therewith because placement of such pieces about the bladdered mandrel is very inexact. In addition, the flexible but non-elastic thin-film bladders disclosed in these methods also, upon pressurization, poorly and non-uniformly forces the uncured composite material into angular recesses of the mold.

To alleviate these problems, U.S. Pat. No. 6,264,868 to Marchant teaches a method for forming hollow composite material parts, wherein the method utilizes a dual-material mandrel that expands thermally as a solid body such that uncured composite material is pushed uniformly into angular recesses of the mold. In this bladderless method, the dual-material mandrel is made of a water-soluble ceramic body covered by a silicone-elastomer layer that has a coefficient of thermal expansion much greater than the respective coefficients of thermal expansion of the ceramic body and mold. Thus, and upon application of heat, the dual-material mandrel expands uniformly so as to uniformly force the uncured composite material into angular recesses of the mold. U.S. Pat. No. 6,264,868 to Marchant purports that this important feature cannot be achieved accurately by using the balloon or bladder methods known in the art.

Thus, existing state-of-the-art molding systems and related methodologies are not entirely satisfactory for the fabrication of high-precision hollow composite material components or parts, especially those components or parts having complex surface geometries and having one or more core, structural insert, or veneer pieces integrally associated therewith. Moreover, existing molding methodologies have not addressed many of the concomitant problems associated with selectively positioning one or more core pieces on or within the formed hollow composite material components or parts. Accordingly, there is still a need in the art for new and improved molding methodologies and, more specifically, there is a need for a molding methodology that enables the fabrication of a hollow composite material part including those having one or more selectively positioned core, structural insert, or veneer pieces integrally associated therewith. The present invention fulfills these needs and provides for further related advantages.

SUMMARY OF THE INVENTION

In brief, the present invention relates generally to methods for forming hollow components and parts made of fiber reinforced composite materials and, more specifically, to hollow fiber reinforced composite material parts having one or more selectively positioned core, structural insert, or veneer pieces integrally associated therewith. In one embodiment, the composite part defines a first shape and the method comprises at least the following steps: providing a mandrel having an exterior surface and a second shape that is substantially the same as but sized smaller than the first shape of the composite material part, wherein the mandrel has one or more selectively positioned recesses that are complementary to the one or more core pieces; forming an elastic layer about the mandrel to define an elastic bladder; applying a vacuum in between the bladder and the mandrel to thereby force and conform the bladder against the exterior surface of the mandrel; applying a resin and a fiber material about the bladder, and positioning at least one of the one or more core, structural insert, or veneer pieces adjacent and proximate to one of the one or more selectively positioned recesses to define an uncured part; placing the uncured part into a mold, wherein the mold has an interior surface and a third shape that is substantially the same as the first shape of the composite material part; applying a fluid or gas pressure in between the mandrel and the uncured part to thereby force and conform the uncured part against the interior surface of the mold; heating the mold to a temperature and for a period of time sufficient to cure the resin to thereby define the composite material part; liquefying and removing the mandrel from within the composite material part; and optionally removing the bladder from within the composite material part.

In another method, the composite part defines a first shape and the method comprises at least the following steps: providing a first mandrel having an exterior surface and a second shape that is substantially the same as but sized smaller than the first shape of the composite material part, wherein the first mandrel has one or more selectively positioned recesses that are complementary to the one or more core, structural insert, or veneer pieces; providing a second mandrel having an exterior surface and a third shape that is substantially the same as but sized smaller than the second shape of the first mandrel, wherein the second mandrel has one or more selectively positioned recesses that are complementary to the one or more core, structural insert, or veneer pieces; forming an elastic layer about the second mandrel to define an elastic bladder; removing the bladder from about the second mandrel and placing the bladder about the first mandrel; applying a resin and a fiber material about the bladder, and positioning at least one of the one or more core, structural insert, or veneer pieces adjacent and proximate to one of the one or more selectively positioned recesses to define an uncured part; placing the uncured part into a mold, wherein the mold has an interior surface and a fourth shape that is substantially the same as the first shape of the composite material part; applying a fluid or gas pressure in between the mandrel and the uncured part to thereby force and conform the uncured part against the interior surface of the mold; heating the mold to a temperature and for a period of time sufficient to cure the resin to thereby define the composite material part; liquefying and removing the mandrel from within the composite material part; and optionally removing the bladder from within the composite material part.

In further embodiments, the present invention is directed to a hollow composite material part having one or more selectively positioned core, structural insert, or veneer pieces integrally associated therewith made in accordance with one of the methods disclosed herein.

These and other aspects of the invention disclosed herein will become more evident upon reference to the following detailed description and attached drawings. It is to be understood, however, that various changes, alterations, and substitutions may be made to the specific embodiments disclosed herein without departing from their essential spirit and scope. In addition, it is to be further understood that the drawings are intended to be illustrative and symbolic representations of an exemplary embodiment of the present embodiment and that other non-illustrated embodiments are within the scope of the present invention.

BRIEF DESCRIPTION OF THE DRAWINGS

Like reference numerals are used to designate like features throughout the several views of the drawings, and.

DETAILED DESCRIPTION OF THE INVENTION

Figure 1:
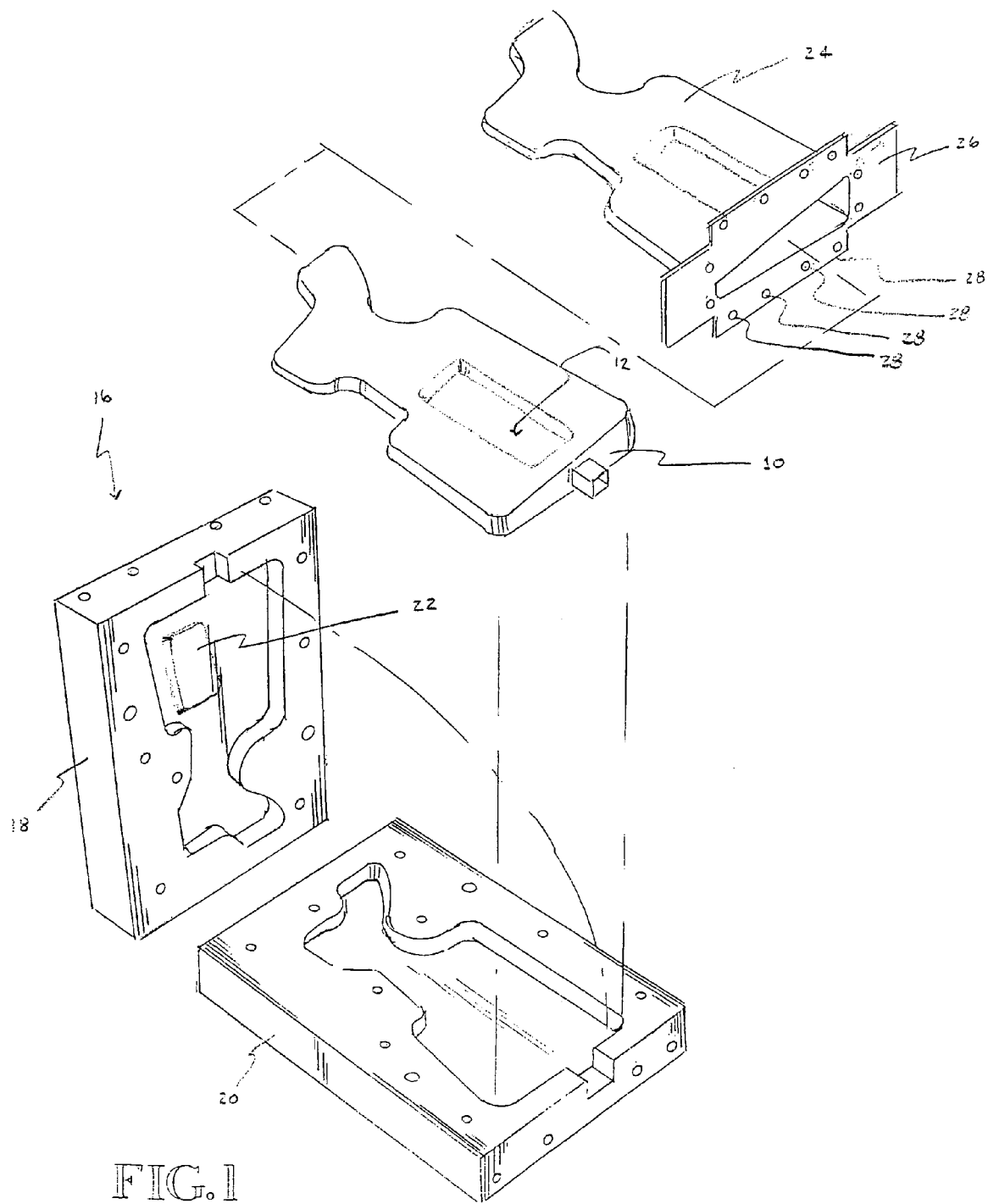
FIG. 1 is a perspective exploded view of a two-part mold adapted to receive a mandrel having a surrounding bladder in accordance with an embodiment of the present invention.
Figure 2:
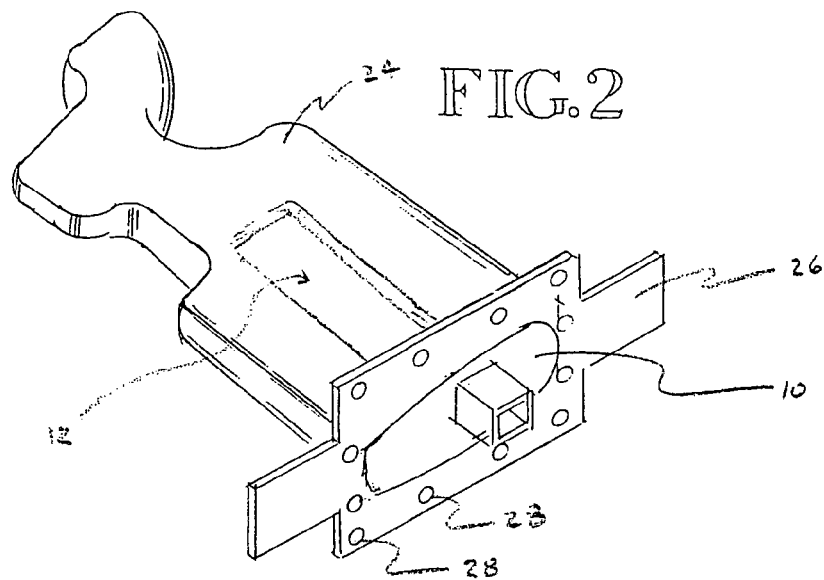
FIG. 2 is a perspective pictorial view of a mandrel having a surrounding bladder in accordance with an embodiment of the present invention.

As noted above, the present invention relates generally to methods for forming hollow components and parts made of fiber reinforced composite materials and, more specifically, to hollow fiber reinforced composite material parts having one or more selectively positioned core, structural insert, or veneer pieces integrally associated therewith. As is appreciated by those skilled in the art, a composite material part is generally made by molding a plurality of fibers together with an appropriately selected resin. Within the context of the present invention, the plurality of fibers may be woven together so as to form a yarn, a fabric or a cloth such as a braid (all of which are encompassed by the term "fiber material"). The principal fibers and fiber materials useful in the context of the present invention include those made of glass (preferably S-glass or E-glass), KEVLAR, carbon, boron, or silicon carbide. In addition, the principal resins include thermoplastic resins such as, for example, polypropylene, polyphenylene sulfone, polyamide, and polyether-ether-ketone based resins; and thermoset resins such as, for example, polyesters, vinyl esters, epoxies, and phenolics, as well as melamine, silicone, and polyurethane based resins (all of which are encompassed by the term "resin").

In view of the foregoing and with reference to FIGS. 1-6, the present invention in one embodiment is directed to a method for forming a hollow composite material part 32 having one or more selectively positioned core, structural insert, or veneer pieces 14 integrally associated therewith. In this method, a mandrel 10 is provided that defines a shape that is substantially the same but sized just a bit smaller than the desired shape of the part to be formed. The mandrel 10 further includes one or more selectively positioned recesses 12 that are complementary to the one or more core, structural insert, or veneer pieces 14 (meaning the recesses 12 are adapted to receive the core, structural insert, or veneer pieces 14). In general, the mandrel 10 is sized such that it is dimensionally smaller in all directions by about 2 to 4 percent as compared to the dimensions of the part to be formed. Importantly, the mandrel 10 is made of a material that is readily meltable, dissolvable, or otherwise disintegratable such as, for example, a wax or a foamed material. In this regard, the wax may be a micro-crystalline sculpture or casting victory brown wax (which wax preferably has a melting point of about between 160° to 165° F.) and the foamed material may be a foamed starch material (e.g., ECO-FOAM available from National Starch and Chemical Company, U.S.A). The mandrel 10 is generally formed from a first split mold 16, wherein the split mold 16 preferably consist essentially of two engageable parts 18, 20 machined form a solid metal (e.g., aluminum) block. As shown, the first part 18 of the split mold 16 includes one or more protrusions 22 that are for forming the one or more selectively positioned recesses 12 formed (imprinted) into the mandrel 10.

Next, an elastic layer is formed about the imprinted mandrel 10 so as to define an elastic bladder 24 that has an outwardly extending flange 26. The elastic bladder 24 with flange 26 may be made of an elastic material such as, for example, a latex or a silicone rubber (e.g., SILASTIC available from Dow Corning Corporation, U.S.A.) as is appreciated by those skilled in the art. In this regard, an additional split mold (not shown) is provided that has a mold cavity configuration that is substantially the same but sized just a bit larger (e.g., 1 to 3 centimeters in all directions) than the shape of the mandrel 10. In this way, the mandrel 10 may be placed within the slightly larger mold, the mold closed, and the latex or silicone rubber material injected into the mold between the mold cavity wall and mandrel 10. The latex or silicone rubber material may then be cured to thereby yield the elastic bladder 24. A plurality of holes 28 may then be formed in the flange 26 portion of the elastic bladder 24 to facilitate assembly of auxiliary tooling needed for subsequent curing and vacuuming steps.

Figure 3:
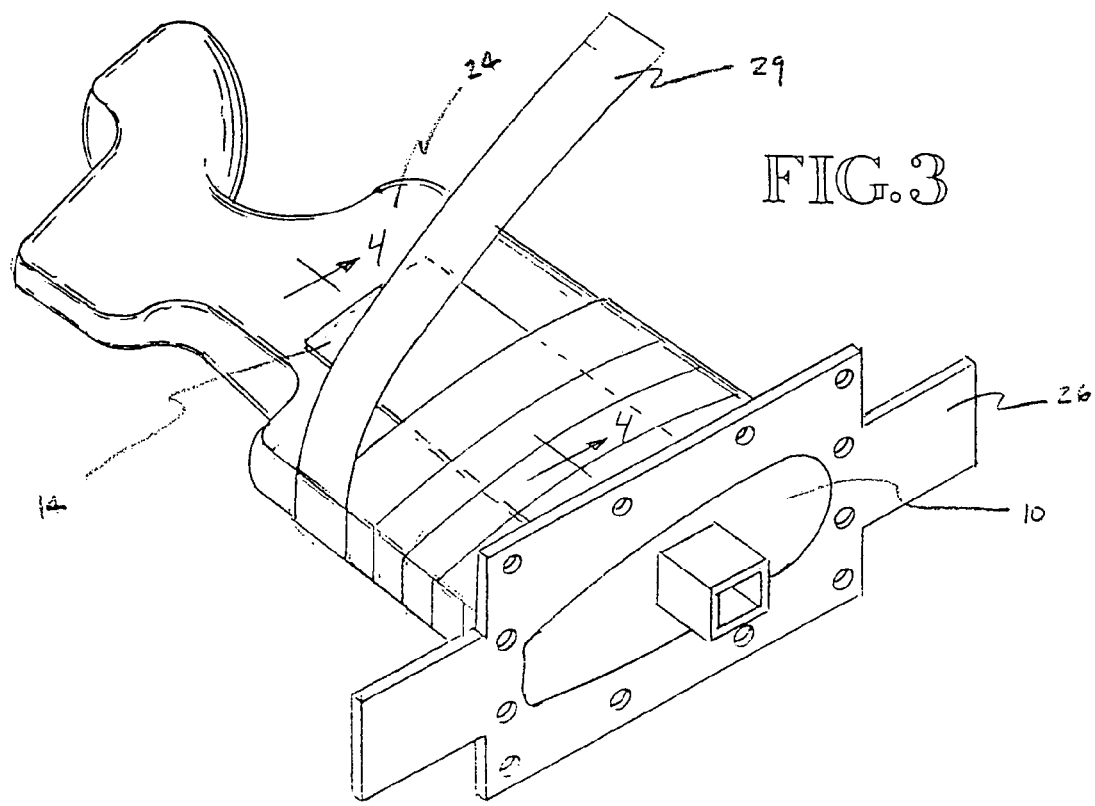
FIG. 3 is a perspective pictorial view of a mandrel having a surrounding bladder in accordance with an embodiment of the present invention, wherein the drawing depicts a fiber cloth material being wrapped about the bladder in accordance with an embodiment of the present invention.
Figure 4:
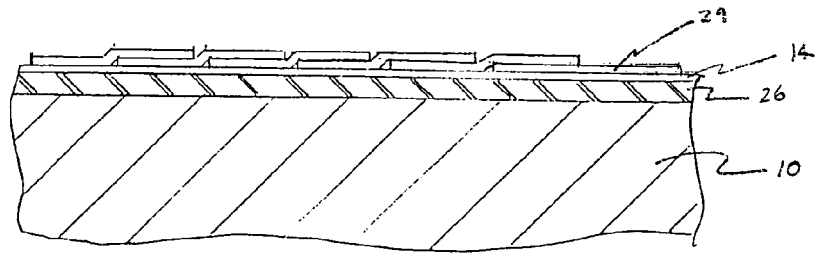
FIG. 4 is a cross sectional view taken along line 4-4 of the mandrel having the surrounding and partially wrapped bladder shown in FIG. 3.
Figure 5:
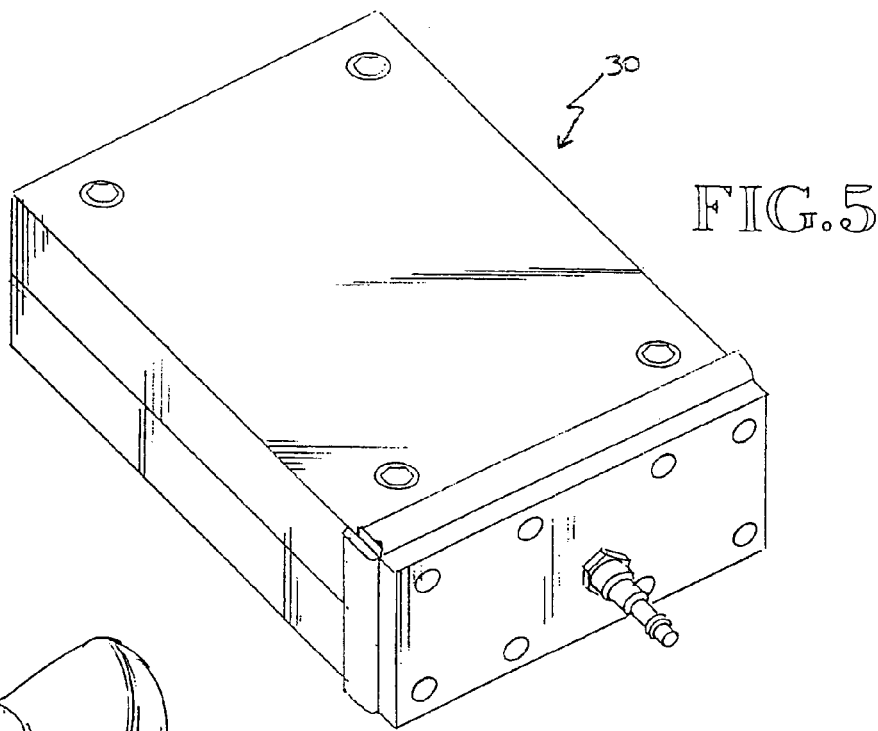
FIG. 5 is a side perspective view of the two-part mold shown in FIG. 1, wherein the mold is closed and readied for application of a fluid pressure or a vacuum.
Figure 6:
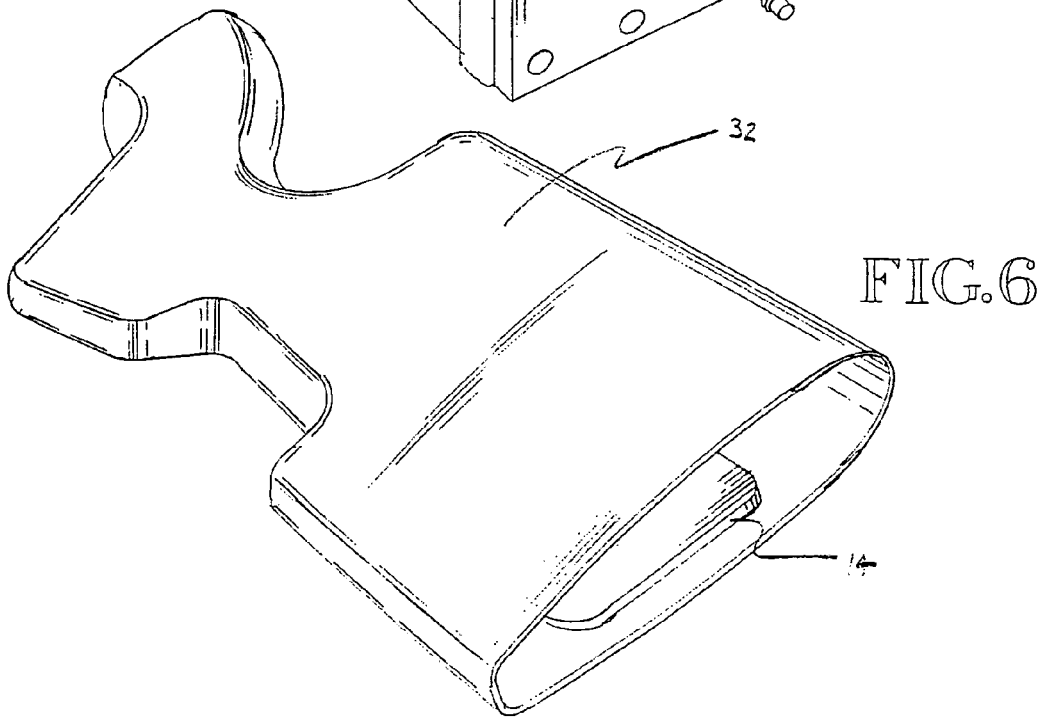
FIG. 6 is a side perspective view of a hollow composite material part having one or more selectively positioned core pieces integrally associated therewith made in accordance with an embodiment of the present invention.

In order to force and conform the elastic bladder 24 against the exterior surface of the mandrel 10, a vacuum may be applied in between the bladder 24 and the mandrel 10 (via not shown auxiliary tooling and vacuum hose). Then, an appropriately selected resin and fiber material as identified above may be applied about the bladder 24 (under vacuum), and at least one of the one or more core, structural insert, or veneer pieces 14 may be positioned adjacent and proximate (but with the elastic layer in between) to the one or more selectively positioned recesses 12 formed into the mandrel 10 so as to define an uncured part. As is appreciated by those skilled in the art, the core piece(s) may be made of a honeycomb material, the structural insert may be made of a metal or a plastic, and the veneer may be made of wood. Unlike the methods known in the prior art, the selectively positioned recesses 12 imprinted into the mandrel 10 allows for consistent and uniform placement of the core, structural insert, or veneer pieces 14 with respect to the part to be formed. Thus, and for example and as best shown in FIG. 3, a resin pre-impregnated fiber glass cloth material 29 may be uniformly wrapped about the mandrel 10 and bladder 24, and a piece of core, structural insert, or veneer may be placed in the imprinted and selectively positioned recess 12 such that it is sandwiched between interposing layers of the cloth material 29 so as to define an uncured part.

The uncured part may then be placed in yet another split mold 30 that has a shape that is substantially the same as the shape of part to be formed. The split mold 30 is generally configured in such a way that a fluid (e.g., air) pressure may be applied in between the mandrel 10 and the uncured part so as to force and conform (by slight expansion of the bladder 24) the uncured part against the interior surface of the mold 30. Concurrently, the mold 30 may be heated to a temperature (e.g., room temperature to up to about 400° F., but below the melting temperature of the mandrel) and for a period of time (e.g., about 30 minutes to about 4 hours) sufficient to cure the resin and to thereby define the composite material part 32. The heating of the mold 30 may be effectuated by use of removable heat elements or rods (not shown). After curing of the part, the mandrel 10 may then be removed from within the cavity of the hollow composite material part 32 by heating to liquefy it if the mandrel 10 is made of a meltable wax, or by dissolving it with an appropriate solvent if the mandrel 10 is made of a foamed starch material. Similarly, the elastic bladder 24 may be removed by pulling it out of one of openings of the cured part 32.

In another method (not shown), the composite part defines a first shape and the method comprises at least the following steps: providing a first mandrel having an exterior surface and a second shape that is substantially the same as but sized smaller than the first shape of the composite material part, wherein the first mandrel has one or more selectively positioned recesses that are complementary to the one or more core, structural insert, or veneer pieces; providing a second mandrel having an exterior surface and a third shape that is substantially the same as but sized smaller than the second shape of the first mandrel, wherein the second mandrel has one or more selectively positioned recesses that are complementary to the one or more core, structural insert, or veneer pieces; forming an elastic layer about the second mandrel to define an elastic bladder; removing the bladder from about the second mandrel and placing the bladder about the first mandrel; applying a resin and a fiber material about the bladder, and positioning at least one of the one or more core, structural insert, or veneer pieces adjacent and proximate to one of the one or more selectively positioned recesses to define an uncured part; placing the uncured part into a mold, wherein the mold has an interior surface and a fourth shape that is substantially the same as the first shape of the composite material part; applying a fluid or gas pressure in between the mandrel and the uncured part to thereby force and conform the uncured part against the interior surface of the mold; heating the mold to a temperature and for a period of time sufficient to cure the resin to thereby define the composite material part; liquefying and removing the mandrel from within the composite material part; and optionally removing the bladder from within the composite material part.

While the present invention has been described in the context of the embodiments illustrated and described herein, the invention may be embodied in other specific ways or in other specific forms without departing from its spirit or essential characteristics. Therefore, the described embodiments are to be considered in all respects as illustrative and not restrictive. The scope of the invention is, therefore, indicated by the appended claims rather than by the foregoing description, and all changes that come within the meaning and range of equivalency of the claims are to be embraced within their scope.

What is claimed is:

1. A method for forming a hollow composite material part having one or more selectively positioned core, structural insert, or veneer pieces integrally associated therewith, wherein the composite part defines a first shape, and wherein the method comprises at least the following steps:

providing a dissolvable solid mandrel having an exterior surface and a second shape that is substantially the same as but sized smaller than the first shape of the composite material part, wherein the mandrel has one or more selectively positioned recesses that are complementary to the one or more core, structural insert, or veneer pieces:

forming an elastic layer about the mandrel to define an elastic bladder;

applying a vacuum in between the bladder and the mandrel to thereby force and conform the bladder against the exterior surface of the mandrel;

applying a resin and a fiber material about and immediately adjacent to the bladder, and positioning at least one of the one or more core, structural insert, or veneer pieces adjacent and proximate to one of the one or more selectively positioned recesses to define an uncured part;

placing the uncured part into a split mold, wherein the split mold has an interior surface and a third shape that is substantially the same as the first shape of the composite material part;

applying a fluid or gas pressure in between the mandrel and the uncured part to thereby force and conform the uncured part against the interior surface of the split mold;

heating the split mold to a temperature and for a period of time sufficient to cure the resin to thereby define the composite material part;

liquefying and removing the mandrel from within the composite material part; and optionally removing the bladder from within the composite material part.

2. The method of claim 1 wherein the one or more core pieces is made from a honeycomb material.

3. The method of claim 1 wherein the one or more structural insert pieces is made from a metal or a plastic.

4. The method of claim 1 wherein the one or more veneer pieces is made from a wood.

5. The method of claim 1 wherein the dissolvable mandrel is made of a wax or a foamed material.

6. The method of claim 1 wherein the bladder is made from a silicone rubber material.

7. The method of claim 1 wherein the resin is selected from one or more of a polyester resin, a vinyl ester resin, an epoxy resin, and a phenolic resin.

8. The method of claim 1 wherein the fiber material is selected from one or more of a glass fiber material and a carbon fiber material.

9. The method of claim 1 wherein the applied fluid or gas pressure ranges from about 50 psi to about 150 psi.

10. The method of claim 1 wherein the temperature of the heated split mold ranges from about room temperature to about 400° F.

11. The method of claim 1 wherein the period of time sufficient to cure the resin ranges from about 30 minutes to about 4 hours.

12. The method of claim 1, further comprising the step of applying a second vacuum in between the uncured part and the interior surface of the mold.

* * * * *

UNITED STATES PATENT AND TRADEMARK OFFICE
CERTIFICATE OF CORRECTION

PATENT NO. : 7,638,084 B2 Page 1 of 1
APPLICATION NO. : 10/805145
DATED : December 29, 2009
INVENTOR(S) : Kenneth A. Frankel It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 510 days.

Signed and Sealed this

Ninth Day of November, 2010

David J. Kappos
*Director of the United States Patent and Trademark Office*